US011535215B2

United States Patent
Nagasaka

(10) Patent No.: US 11,535,215 B2
(45) Date of Patent: Dec. 27, 2022

(54) DEVICE FOR AND METHOD OF CONTROLLING VEHICLE

(71) Applicant: TOYOTA JIDOSHA KABUSHIKI KAISHA, Toyota (JP)

(72) Inventor: Manabu Nagasaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/372,895

(22) Filed: Jul. 12, 2021

(65) Prior Publication Data

US 2022/0063576 A1 Mar. 3, 2022

(30) Foreign Application Priority Data

Aug. 28, 2020 (JP) .............................. JP2020-144472

(51) Int. Cl.
*B60T 8/24* (2006.01)
*B60T 8/1755* (2006.01)

(52) U.S. Cl.
CPC .......... *B60T 8/245* (2013.01); *B60T 8/17551* (2013.01); *B60T 8/17554* (2013.01); *B60T 2201/16* (2013.01)

(58) Field of Classification Search
CPC ................. B60T 8/245; B60T 8/17551; B60T 8/17554; B60T 2201/16
USPC ........................................................ 701/70
See application file for complete search history.

(56) References Cited

U.S. PATENT DOCUMENTS

| 7,909,416 | B2 * | 3/2011 | Maeda ................. | B60T 8/1769 303/146 |
|---|---|---|---|---|
| 2011/0035089 | A1 | 2/2011 | Hirao et al. | |
| 2012/0022760 | A1 * | 1/2012 | Kato ..................... | B60W 10/10 701/70 |
| 2012/0316744 | A1 * | 12/2012 | Shimura ................. | F02D 29/02 701/72 |
| 2013/0079988 | A1 | 3/2013 | Hirao et al. | |
| 2019/0100210 | A1 | 4/2019 | Imamura et al. | |

FOREIGN PATENT DOCUMENTS

| JP | 2007-237933 A | | 9/2007 |
|---|---|---|---|
| JP | 2011-031795 A | | 2/2011 |
| JP | 2011-042263 A | | 3/2011 |
| JP | 2013-071558 A | | 4/2013 |
| JP | 2013-154834 A | | 8/2013 |
| JP | 2017109663 A | * | 6/2017 |
| JP | 2018-079872 A | | 5/2018 |
| JP | 2019-064414 A | | 4/2019 |

* cited by examiner

*Primary Examiner* — Isaac G Smith
(74) *Attorney, Agent, or Firm* — Sughrue Mion, PLLC

(57) ABSTRACT

A device 10 for controlling a vehicle 1 includes: a sensor 20 configured to detect a rudder angle; a calculation part 40a configured to calculate a target braking force for making a pitch angle equal to a target pitch angle, the target braking force increasing as the rudder angle increases; a determination part 40b configured to determine whether a steering action is in a steady state; a correction part 40c configured to correct the target braking force to be reduced by an offset amount when it is determined that the steering action is in a steady state; and an actuator 30 configured to apply the corrected target braking force to the vehicle.

8 Claims, 8 Drawing Sheets

DEVICE FOR AND METHOD OF CONTROLLING VEHICLE

FIELD

The present disclosure relates to a device for and method of controlling a vehicle.

BACKGROUND

A device for controlling vehicle body posture, which device acquires a roll angle of a vehicle body when a vehicle turns and controls a pitch angle of the vehicle body according to the roll angle, is known (see, for example, PTL 1). In PTL 1, a braking force generated by a brake is controlled so as to control the forward and rearward accelerations of the vehicle body, so that the pitch angle is controlled.

CITATIONS LIST

Patent Literature

[PTL 1] Japanese Unexamined Patent Publication (Kokai) No. 2007-237933

SUMMARY

Technical Problem

However, when the braking force is controlled as in PTL 1, the braking force may be increased even if a driver does not operate the brake pedal. Therefore, when the steering angle is in a steady state, the braking force may gradually increase, and accordingly, a reduction of the vehicle speed, which is not intended by the driver, may occur.

Solution to Problem

The present disclosure provides the following configurations.

[Configuration 1]
A device for controlling a vehicle, comprising:
a sensor configured to detect a rudder angle;
a processor configured to:
calculate a target braking force for making a pitch angle equal to a target pitch angle, the target braking force increasing as the rudder angle increases;
determine whether a steering action is in a steady state; and
correct the target braking force to be reduced by an offset amount when it is determined that the steering action is in a steady state; and
an actuator configured to apply the corrected target braking force to the vehicle.

[Configuration 2]
The device according to configuration 1, wherein the processor is configured to increase the offset amount with a predetermined rate of change when it is determined that the steering action is in a steady state.

[Configuration 3]
The device according to configuration 2, wherein the processor is configured to limit the rate of change to an allowable value determined according to the jerk of the rudder angle.

[Configuration 4]
The device according to configuration 2, wherein the processor is configured to limit the offset amount to the target braking force.

[Configuration 5]
The device according to configuration 2, wherein the processor is configured to reduce the offset amount by a decrease amount of the target braking force when it is determined that the steering action is in a steady state.

[Configuration 6]
The device according to configuration 1, wherein the processor is configured to maintain the offset amount when it is determined that the steering action is not in a steady state.

[Configuration 7]
The device according to configuration 1, wherein the processor is configured to determine whether the steering action is in a steady state, based on an absolute value of a time derivative value of the target braking force.

[Configuration 8]
A method of controlling a vehicle, comprising:
by a sensor, detecting, by a sensor, a rudder angle;
by a processor:
calculating target braking force for making a pitch angle equal to a target pitch angle, the target braking force increasing as the rudder angle increases;
determining whether a steering action is in a steady state; and
correcting the target braking force to be reduced by an offset amount when it is determined that the steering action is in a steady state; and
by an actuator, applying the corrected target braking force to the vehicle.

Advantageous Effects of Invention

It is possible to limit the reduction of the vehicle speed, which is not intended by the driver or an occupant while ensuring a stable vehicle posture during a steady steering action.

DESCRIPTION OF EMBODIMENTS

Figure 1:
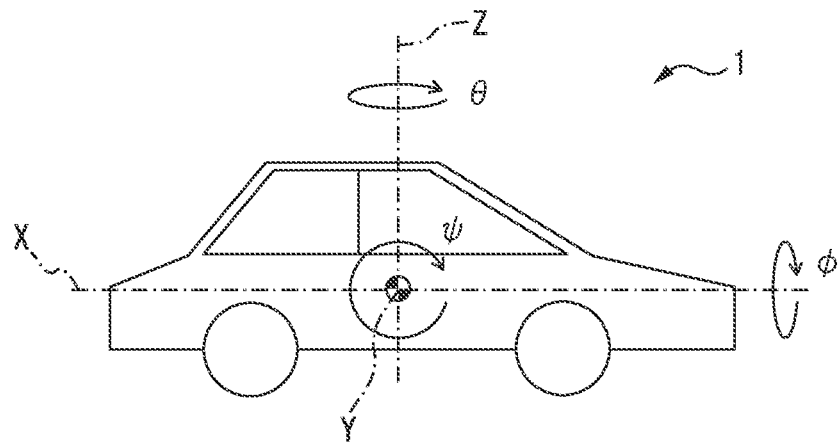
FIG. 1 is a schematic overall view of a vehicle.

FIG. 1 shows the length or longitudinal direction axis X, the width direction axis Y, and the height direction axis Z of a vehicle 1 of an embodiment according to the present disclosure, which are orthogonal to one another. The angle or posture of the vehicle 1 about the length direction axis X is represented by a roll angle φ. The roll angle φ is zero, for example, when the right-side portion and the left-side portion of the vehicle 1 are located at the same height. The roll angle φ increases as the right-side portion is lower than the left-side portion, and decreases as the right-side portion is higher than the left-side portion. On the other hand, the angle or posture of the vehicle 1 about the width direction axis Y is represented by a pitch angle ψ. The pitch angle ψ is zero, for example, when the front portion and the rear portion of the vehicle 1 are located at the same height. The pitch angle ψ increases as the front portion is lower than the rear portion, and decreases as the front portion is higher than the rear portion. The angle or posture of the vehicle 1 about the height direction axis Z is represented by a yaw angle θ. The vehicle 1 of the embodiment according to the present disclosure includes four or more wheels.

Figure 2:
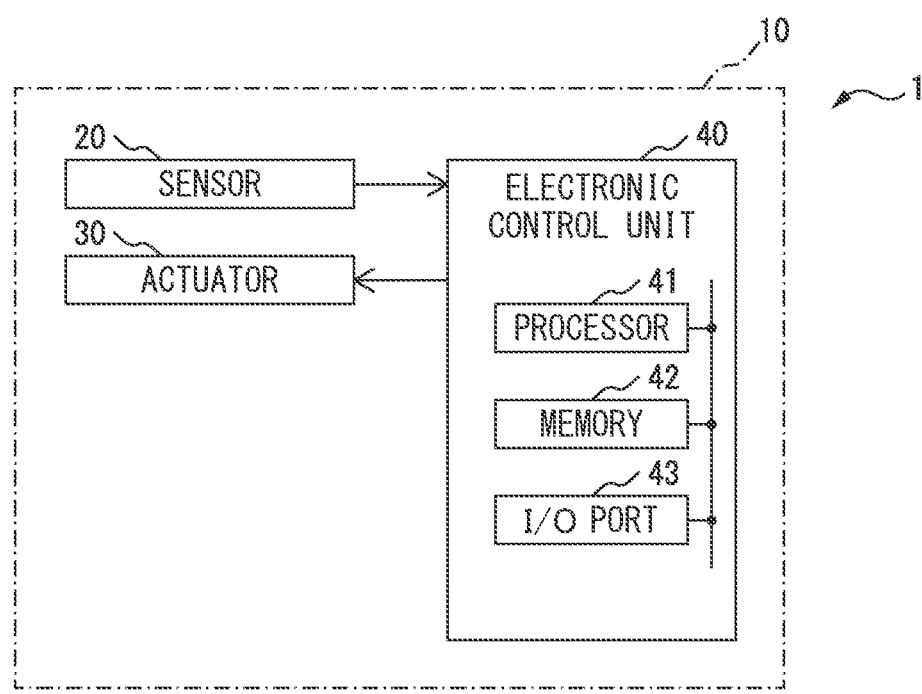
FIG. 2 is a schematic view of a device for controlling a vehicle of an embodiment according to the present disclosure.

Referring to FIG. 2, a device 10 for controlling a vehicle 1 of an embodiment according to the present disclosure includes a sensor 20, an actuator 30, and an electronic control unit 40.

The sensor 20 of the embodiment according to the present disclosure includes, for example, a vehicle speed sensor for detecting a vehicle speed, a steering angle sensor for detecting a steering angle, etc.

The actuator 30 of the embodiment according to the present disclosure applies a braking/driving force to the vehicle 1 in order to apply a pitch moment to the vehicle 1. The actuator 30 of the embodiment according to the present disclosure includes, for example, a brake. For example, the pitch angle increases as the braking force generated by braking increases, and the pitch angle decreases as the braking force generated by braking decreases. In another embodiment (not shown), the actuator 30 includes a suspension capable of controlling a damping force, an internal combustion engine or electric motor (motor generator) capable of controlling a driving force, etc.

The electronic control unit 40 of the embodiment according to the present disclosure includes one or more processors 41, one or more memories 42, and an input/output (I/O) port 43, which are communicably connected to one another by a bidirectional bus. The memories 42 include, for example, a ROM, a RAM, etc. Various programs are stored in the memories 42, and these programs are executed by the processors 41 so as to realize various functions. The sensor 20 and the actuator 30 described above are communicably connected to the input/output port 43 of the embodiment according to the present disclosure. Further, in the processors 41 of the embodiment according to the present disclosure, an actual steering angle is calculated based on a steering angle detected by a steering angle sensor.

If the vehicle 1, for example, turns while traveling, the roll angle may vary or vibrate, and the driving stability of the vehicle 1 may be lowered. Therefore, in the embodiment according to the present disclosure, roughly speaking, the pitch angle is controlled according to the roll angle, so that the driving stability of the vehicle 1 is maintained.

In the embodiment according to the present disclosure, a braking force is applied to the vehicle 1 in order to control the pitch angle. In this respect, if the braking force is simply applied during a steady steering action, the vehicle speed may decrease unfavorably, as described at the beginning of this specification. Therefore, in the embodiment according to the present disclosure, roughly speaking, a target braking/driving force is corrected to be reduced during a steady steering action, and the corrected target braking/driving force is applied to the vehicle 1. As a result, a reduction of the vehicle speed, which is not intended by the driver or an occupant, is limited while a stable vehicle posture is ensured during a steady steering action. Further, energy loss due to braking is also limited.

Specifically, in the embodiment according to the present disclosure, first, a target braking/driving force reqFx (N) for making an actual pitch angle equal to a target pitch angle is calculated. Note that, when the braking/driving force is a positive value, a driving force acts on the vehicle 1, and when the braking/driving force is a negative value, a braking force acts on the vehicle 1. Then, whether a steering action is in a steady state, i.e., whether a steering operation of the vehicle 1 is in a steady state is determined. Then, an offset amount or a correction amount ofstFx (N) is calculated. In this respect, the offset amount ofstFx is increased with a predetermined rate of change when it is determined that the steering action is in a steady state, and is maintained when it is determined that the steering action is not in a steady state or the steering action is a transient state. Then, a corrected target braking/driving force stcutFx (N) is calculated by adding the offset amount ofstFx to the target braking/driving force reqfFx (stcutFx=reqFx+ofstFx). In other words, the corrected target braking/driving force stcutFx is calculated by correcting the target braking/driving force reqFx by the offset amount ofstFx. Then, an actuator 30 is controlled to make the actual braking/driving force equal to the corrected target braking/driving force stcutFx.

Figure 3:
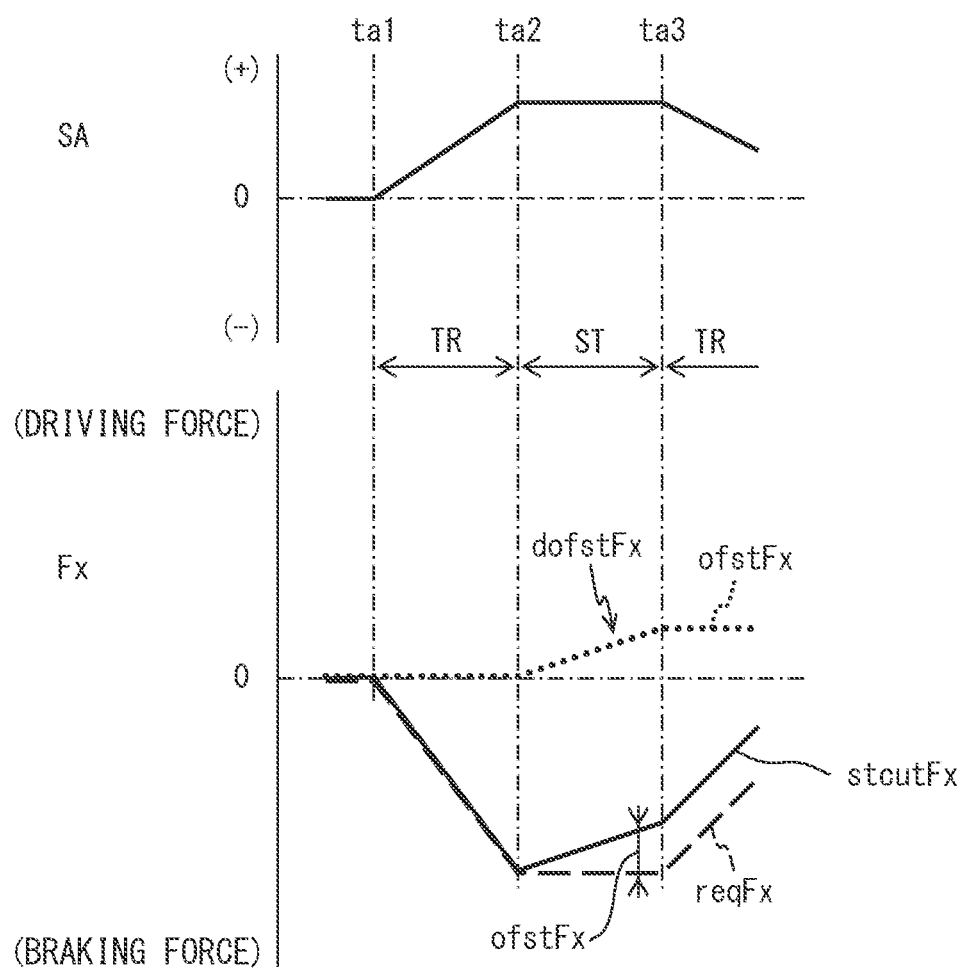
FIG. 3 is a time chart for explaining an embodiment according to the present disclosure.

The embodiment according to the present disclosure will be further described with reference to FIG. 3. In an example shown in FIG. 3, at time ta1, a steering angle SA increases from zero, and the target braking/driving force reqFx decreases from zero accordingly. In this case, it is determined that the steering action is in a transient state (TR), and the offset amount ofstFx is maintained at zero. As a result, the corrected target braking/driving force stcutFx decreases as in the target braking/driving force reqFx. That is, the braking force increases.

Then, at time tat, the steering angle SA is constant, and the target braking/driving force reqFx is also constant. In this respect, it is determined that the steering action is in a steady state (ST), and the offset amount ofstFx is increased with the rate of change dofstFx. As a result, the corrected target braking/driving force stcutFx increases with respect to the target braking/driving force reqFx. That is, the braking force decreases. Therefore, a reduction of vehicle speed during a steady steering action is limited.

In this respect, the corrected target braking/driving force stcutFx is changed with the rate of change dofstFX of the offset amount ofstFx, that is, is not changed rapidly. Therefore, the driving stability of the vehicle 1 is maintained. Note that, when the corrected target braking/driving force stcutFx does not coincide with the target braking/driving force reqFx, the actual pitch angle does not necessarily coincide with the target pitch angle. In another embodiment (not shown), the offset amount ofstFx is set to a constant value.

Then, at time ta3, the steering angle SA changes, and the target braking/driving force reqFx also changes. In this case, it is determined that the steering action is in a transient state (TR), and the offset amount ofstFx is maintained, that is, does not change. As a result, the corrected target braking/driving force stcutFx changes at the same rate of change as the target braking/driving force reqFx or the steering angle SA. Therefore, the actual pitch angle also changes according to the change in the steering angle SA. In another embodiment (not shown), the change is made when it is determined that the steering action is in a transient state.

The target braking/driving force reqFx in the embodiment according to the present disclosure is calculated, for example, as follows. That is, first, a roll angle (rad) is estimated based on the actual rudder angle (deg) and the vehicle speed (m/s). In one example, the roll angle is estimated in consideration of a response delay of the roll angle with respect to the steering angle. The target pitch angle (rad) is then calculated based on the estimated roll angle. In one example, the target pitch angle is calculated by multiplying the roll angle by a gain. Then, a target pitch moment (Nm) for making the actual pitch angle equal to the target pitch angle is calculated. In one example, a target pitch moment is calculated in consideration of a response delay of the pitch angle with respect to the pitch moment. Then, a target braking/driving force reqFx for making the actual pitch moment equal to the target pitch moment is calculated. Then, the target braking/driving force reqFx is filtered.

The determination as to whether the steering action is in a steady state in the embodiment according to the present disclosure is performed, for example, as follows. That is, first, an absolute value of a time differential value DFx(=|(reqFx−reqFxp)/Ts|) of the target braking/driving force reqFx is calculated. Here, reqFxp represents the previous value of the target braking/driving force reqFx, and Ts represents a calculation cycle time. Then, the time differential absolute value DFx is processed using, for example, a low-pass filter. Then, whether the time differential absolute value DFx is equal to or less than a predetermined threshold value thDFx (>0) is determined. If DFx≤thDFx, it is determined that the steering action is in a steady state, and a coefficient α is set to 1. On the contrary, if DFx>thDFx, it is determined that the steering action is not in a steady state or the steering action is in a transient state, and the coefficient α is set to zero.

In another embodiment (not shown), whether the steering action is in a steady state is determined based on, for example, time differential values of a steering angle, an actual rudder angle, etc. However, in the embodiment according to the present disclosure, an increase of the offset amount ofstFx is started when it is determined that the steering action is in a steady state, and the increase of the offset amount ofstFx is stopped when it is determined that the steering action is in a transient state. Therefore, determining whether the steering action is in a steady state or the steering action is in a transient state based on the target braking/driving force reqFx or its time differential value, will change the offset amount ofstFx rapidly according to the change of the target braking/driving force reqFx. As a result, the corrected target braking/driving force stcutFx is controlled at a good timing.

In a case where the steering angle SA vibrates, the time differential value of the target braking/driving force reqFx changes across zero when the steering angle SA reaches the maximum value and the minimum value. Thus, for example, in a comparative example in which it is determined that the steering action is in a steady state when the time differential value of the target braking/driving force reqFx is in the vicinity of zero, it may be erroneously determined that the steering action is in a steady state when the steering angle SA reaches the maximum value and the minimum value. On the contrary, the time differential absolute value DFx in the embodiment according to the present disclosure, which is processed by the low-pass filter, is limited from becoming small for a short period of time. Therefore, when the steering angle SA reaches the maximum value and the minimum value, the time differential absolute value DFx is limited from becoming lower than the threshold value thDFx, and accordingly, the erroneous determination is limited.

Calculation of the offset amount ofstFx (≥0) in the embodiment according to the present disclosure is performed, for example, as follows. That is, the offset amount ofstFx (≥0) is calculated by adding a predetermined rate of change dofstFx (N) (≥0) to the previous value ofstFxp of the offset amount ofstFx (ofstFx=ofstFxp+dofstFx).

In the embodiment according to the present disclosure, the rate of change dofstFx of the offset amount is calculated by multiplying a predetermined allowable value limDFx (N) (≥0) by the above-mentioned coefficient α (dofstFx=α·limDFx).

As described above, when it is determined that the steering action is in a steady state, the coefficient α is set to 1, and therefore, the rate of change dofstFx is set to the allowable value limDFx. In this case, the offset amount ofstFx is increased by the allowable value limDFx. On the contrary, when it is determined that the steering action is in a transient state, the coefficient α is set to zero, and therefore, the rate of change dofstFx is set to zero. In this case, the offset amount ofstFx is maintained at the previous value ofstFxp.

Considering the limitation of vehicle speed reduction and the limitation of energy loss, it is preferable that the rate of change dofstFx is as large as possible. However, if the rate of change dofstFx is excessively large, the driver or occupant may feel uncomfortable. Therefore, in the embodiment according to the present disclosure, the rate of change dofstFx is limited to the allowable value limDFx.

In the embodiment according to the present disclosure, the allowable value limDFx is determined according to a jerk of the steering angle. Specifically, the allowable value limDFx increases as the jerk of the steering angle increases.

However, the target braking/driving force reqFx may increase even though it is determined that the steering action is in a steady state. In such a case, the allowable value limDFx is reduced by an increase dltFx of the target braking/driving force reqFx (a decrease of the braking force) (limDFx=limDFx−dltFx). As a result, the offset amount ofstFx is also reduced by the increase dltFx.

Figure 4:
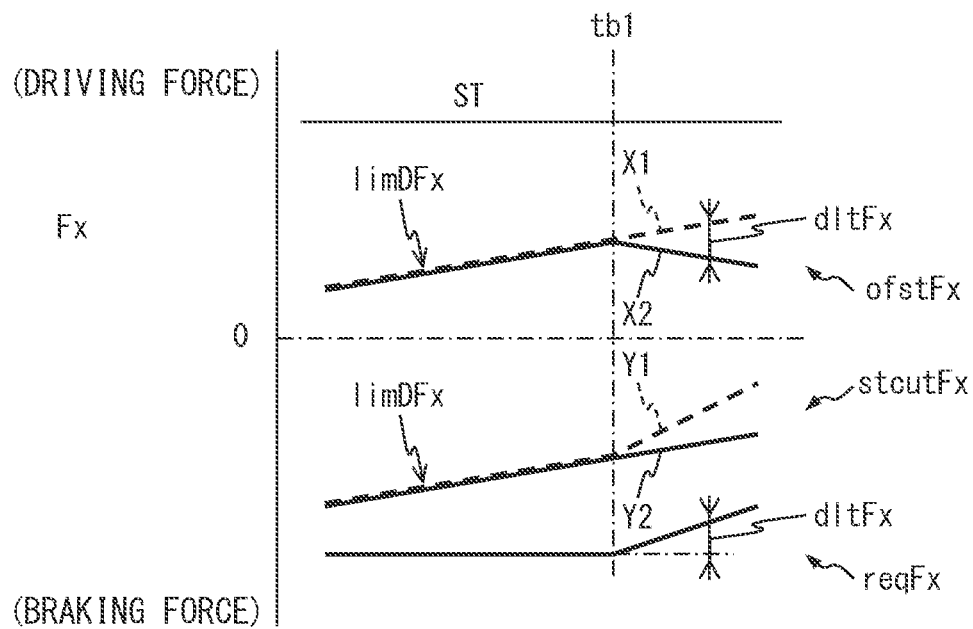
FIG. 4 is a time chart for explaining an embodiment according to the present disclosure.

That is, in an example of FIG. 4 in which it is determined that the steering action is in a steady state before and after the time tb1, the target braking/driving force reqFx does not increase until the time tb1. In this respect, the offset amount ofstFx changes with a rate of change represented by the allowable value limDFx, and the corrected target braking/driving force stcutFx also changes with the rate of change represented by the allowable value limDFx.

Then, in the example shown in FIG. 4, the target braking/driving force reqFx is increased by dltFx at time tb1. In this respect, if the offset amount ofstFx is increased by the allowable value limDFx as shown by a dotted line X1, the rate of change of the corrected target braking/driving force stcutFx is larger than the allowable value limDFx as shown by a dotted line Y1. In other words, the corrected target braking/driving force stcutFx increases rapidly. Therefore, in the embodiment according to the present disclosure, the allowable value limDFx is reduced by an increase dltFx of the target braking/driving force reqFx. As a result, the rate of change of the offset amount ofstFx is maintained at the allowable value limDFx as shown by the solid line X2, and the rate of change of the corrected target braking/driving force stcutFx is maintained at the allowable value limDFx as shown by a solid line Y2.

In addition, in the embodiment according to the present disclosure, the offset amount ofstFx is limited to the absolute value reqFx of the target braking/driving force, i.e., the target braking force. In other words, the offset amount ofstFx is set to the smaller one of the ofstFx calculated as described above and the absolute value reqFx of the target braking/driving force.

Figure 5:
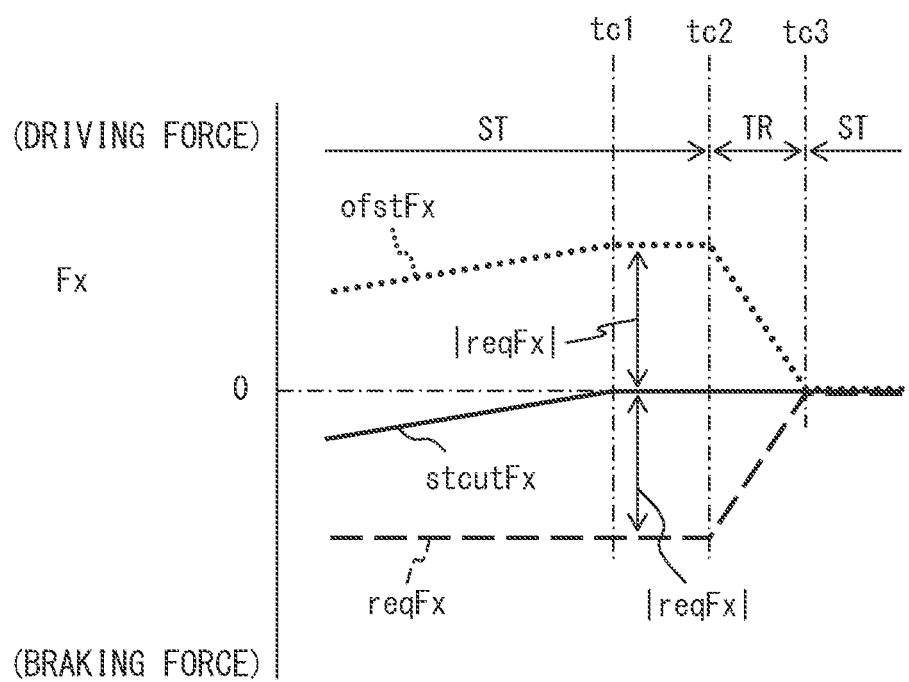
FIG. 5 is a time chart for explaining an embodiment according to the present disclosure.

That is, in an example shown in FIG. 5, the offset amount ofstFx increases and the corrected target braking/driving force stcutFx also increases, until the time tc1. Then, at time tc1, the corrected target braking/driving force stcutFx is zero. At this time, if the offset amount ofstFx continues to increase, i.e., if the offset amount ofstFx is larger than the absolute value reqFx of the target braking/driving force, the corrected target braking/driving force stcutFx is larger than zero, and the driving force acts on the vehicle 1. Therefore, in the embodiment according to the present disclosure, the offset amount ofstFx is limited to the absolute value reqFx of the target braking/driving force.

Note that, in the example shown in FIG. 5, at the following time tc2, the target braking/driving force reqFx increases. In this case, the offset amount ofstFx is also limited to the absolute value reqFx of the target braking/driving force, and therefore, decreases. When the target braking/driving force reqFx reaches zero, at the following time tc3, the offset amount ofstFx also reaches zero. In other words, when the steering angle is returned to zero, the corrected target braking/driving force stcutFx coincides with the target braking/driving force reqFx. As a result, when the steering angle is changed again, a driving force is applied to the vehicle 1 so that the actual pitch angle is made equal to the target pitch angle.

Figure 6:
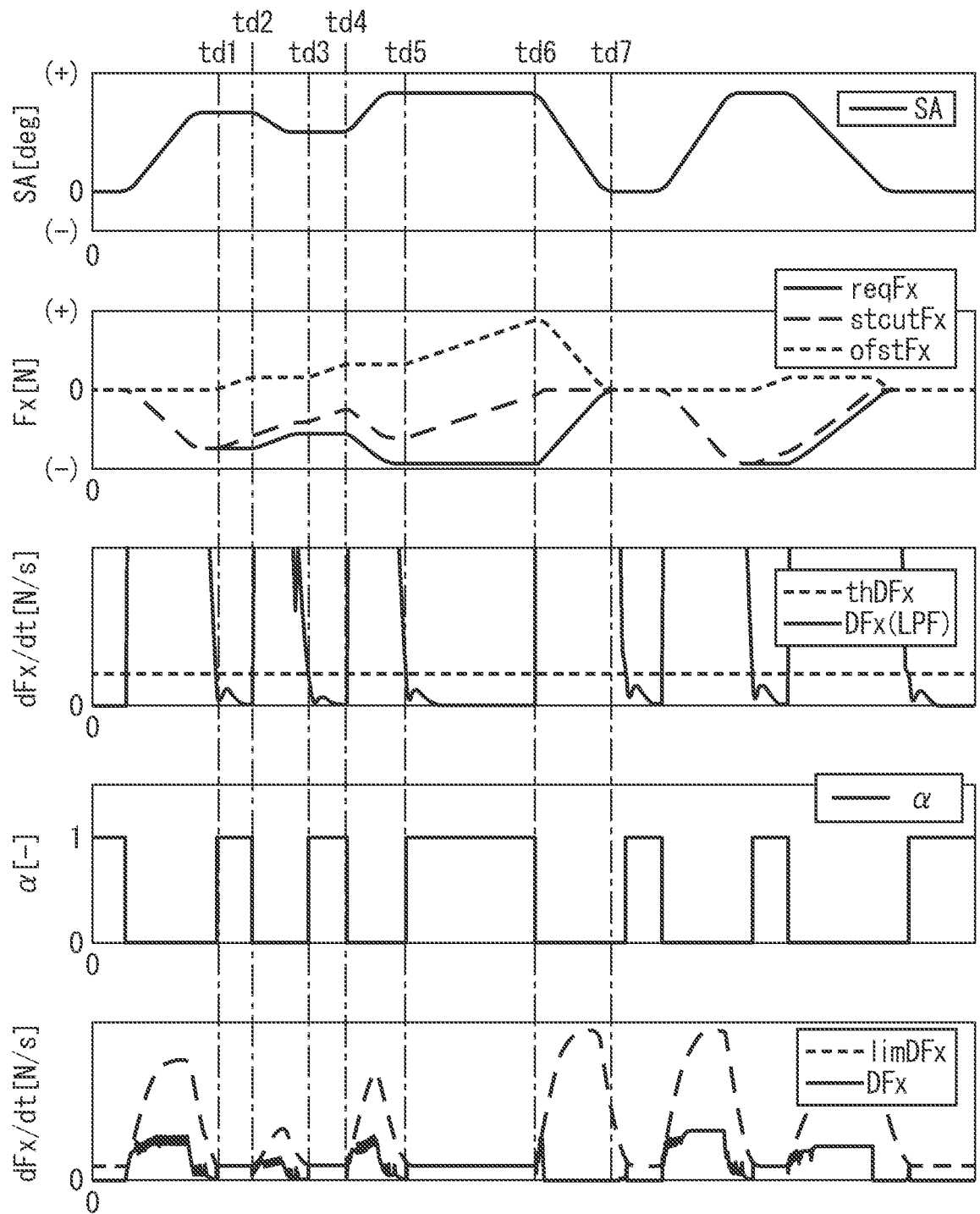
FIG. 6 is a time chart for explaining an embodiment according to the present disclosure.

That is, in an example shown in FIG. 6, from time td1 to time td2, it is determined that the steering action is in a steady state ($\alpha=1$), the offset amount ofstFx is increased, and the corrected target braking/driving force stcutFx is increased with respect to the target braking/driving force reqFx. The same is true for from time td3 to time td4 and from time td5 to time td6. On the contrary, from time td2 to time td3, it is determined that the steering action is in a transient state ($\alpha=0$), the offset amount ofstFx is maintained, and the corrected target braking/driving force stcutFx changes according to the change of the target braking/driving force reqFx. The same is true for from time td4 to time td5. From time td6 to time td7, the offset amount ofstFx is limited to the absolute value |reqFx| of the target braking/driving force, and decreases as the target braking/driving force reqFx increases. At time td7, the offset amount ofstFx returns to zero, and the corrected target braking/driving force stcutFx coincides with the target braking/driving force reqFx.

Figure 7:
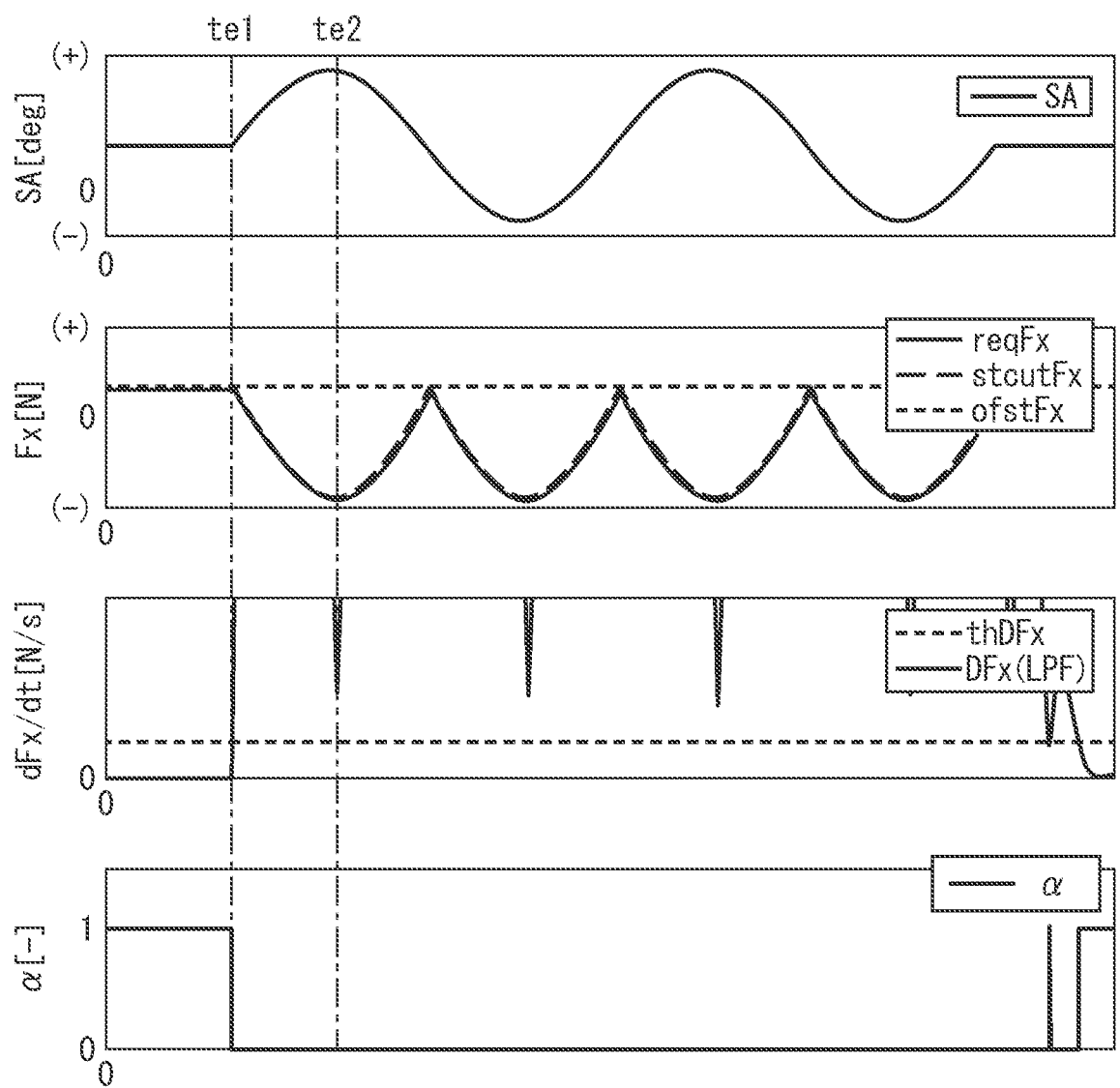
FIG. 7 is a time chart for explaining an embodiment according to the present disclosure.

On the other hand, in an example shown in FIG. 7, it is determined that the steering action is in a steady state ($\alpha=1$) until time te1, but it is determined that the steering action is in a transient state ($\alpha=0$) at time te1. At time te2, the steering angle SA is maximum, and the target braking/driving force reqFx is minimum. At this time, the time differential absolute value DFx is not lower than the threshold value thDFx. Therefore, it is continuously determined that the steering action is in a transient state. That is, the erroneous determination, in which the steering is in a steady state, is limited.

Figure 8:
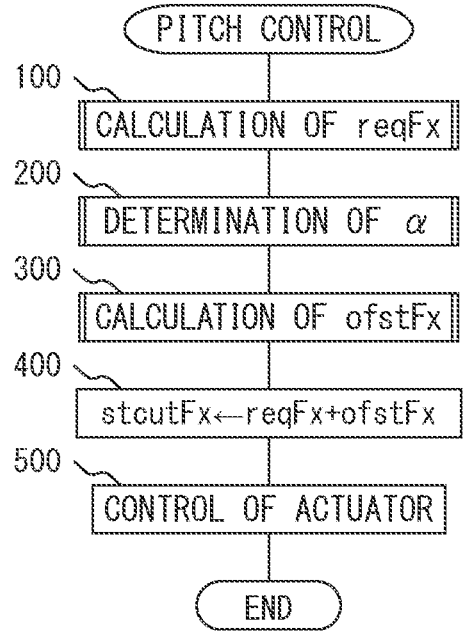
FIG. 8 is a flowchart showing a pitch control routine of an embodiment according to the present disclosure.
Figure 9:
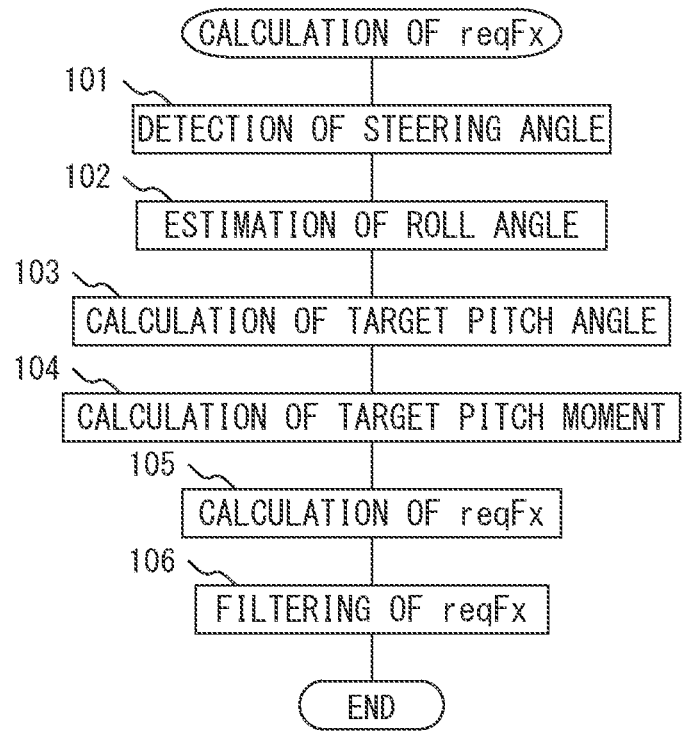
FIG. 9 is a flowchart showing a calculation routine of reqFx of an embodiment according to the present disclosure.
Figure 10:
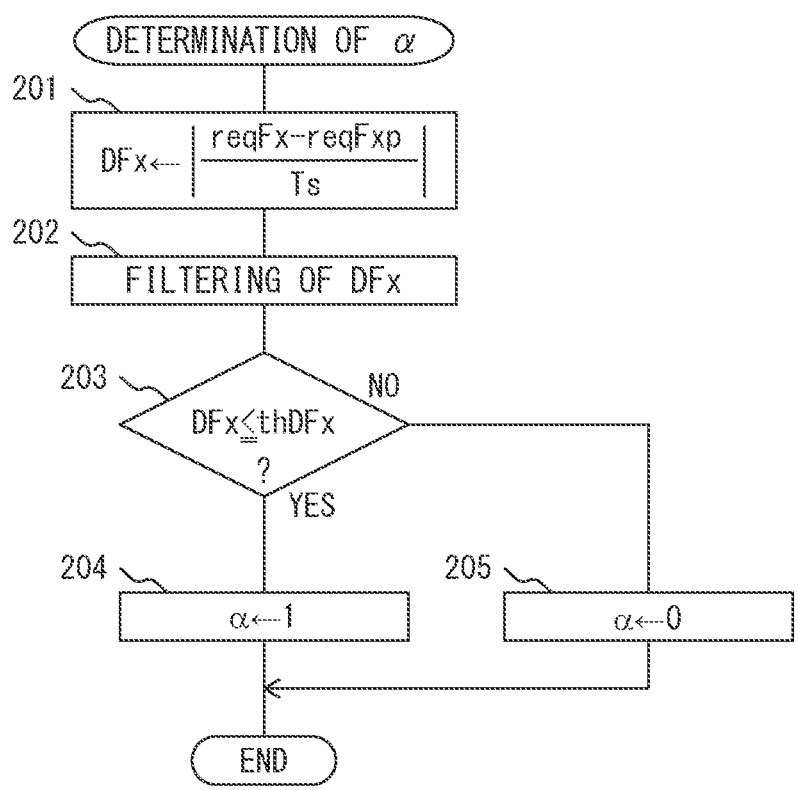
FIG. 10 is a flowchart showing a determination routine of α of an embodiment according to the present disclosure.
Figure 11:
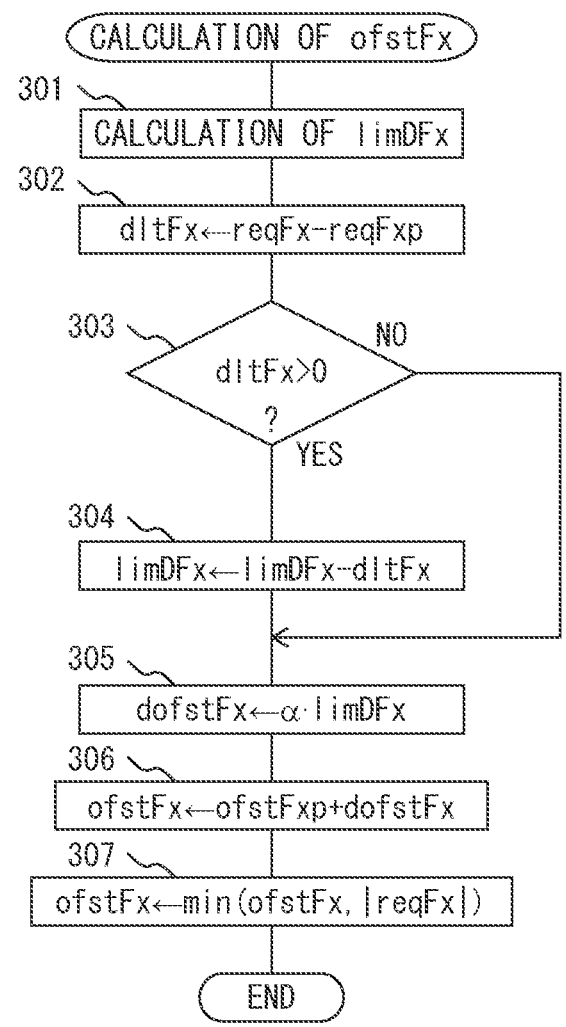
FIG. 11 is a flowchart showing a calculation routine of ofstFx of an embodiment according to the present disclosure.

FIG. 8 shows a pitch control routine of an embodiment according to the present disclosure. Referring to FIG. 8, at step 100, a calculation routine for the target braking/driving force reqFx is executed. This routine is shown in FIG. 9. Subsequently, at step 200, a determination routine for the coefficient $\alpha$ is executed. This routine is shown in FIG. 10. Subsequently, at step 300, a calculation routine for the offset amount ofstFx is executed. This routine is shown in FIG. 11. Subsequently, at step 400, the corrected target braking/driving force stcutFx is calculated (stcutFx=reqFx+ofstFx). Subsequently, at step 500, the actuator 30 is controlled so that the braking/driving force actually applied to the vehicle 1 is equal to the corrected target braking/driving force stcutFx.

FIG. 9 shows a calculation routine for the target braking/driving force reqFx executed at step 100 in FIG. 8. Referring to FIG. 9, at step 101, a steering angle is detected by the sensor 20. At step 102, a roll angle is estimated based on the steering angle. Subsequently, at step 103, a target pitch angle is calculated based on the estimated roll angle. Subsequently, at step 104, a target pitch moment is calculated based on the target pitch angle. Subsequently, at step 105, a target braking/driving force reqFx is calculated based on the target pitch moment. Subsequently, at step 106, the target braking/driving force reqFx is filtered.

FIG. 10 shows a determination routine for the coefficient $\alpha$, which is executed at step 200 in FIG. 8. Referring to FIG. 10, at step 201, the absolute value DFx of the time differential value of the target braking/driving force reqFx is calculated (DFx=|(reqFx−reqFxp)/Ts|). Subsequently, at step 202, the time differential absolute value DFx is filtered. Subsequently, at step 203, whether the time differential absolute value DFx is equal to or less than the threshold value thDFx is determined. When DFx≤thDFx, the process shifts to step 204, and the coefficient $\alpha$ is set to 1. On the contrary, when DFx>thDFx, the process shifts to step 205, and the coefficient $\alpha$ is set to zero.

FIG. 11 shows a calculation routine for the offset amount ofstFx, which is executed at step 300 in FIG. 8. Referring to FIG. 11, at step 301, an allowable value limDFx is calculated based on the steering angle. Subsequently, at step 302, the amount of change dltFx of the target braking/driving force reqFx is calculated (dltFx=reqFx−reqFxp). Subsequently, at step 303, whether the amount of change dltFx is larger than zero, i.e., whether the target braking/driving force reqFx has increased is determined. When dltFx>0, the process then shifts to step 304, and the allowable value limDFx is reduced by the amount of change dltFx (limDFx=limDFx−dltFx). The process then shifts to step 305. On the contrary, when dltFx≤0, the process shifts to step 305 without changing the allowable value limDFx. At step 305, the rate of change dofstFx of the offset amount ofstFx is calculated (dofstFx=$\alpha$·limDFx). Subsequently, at step 306, the offset amount ofstFx is calculated (ofstFx=ofstFxp+dofstFx). Subsequently, at step 307, the offset amount ofstFx is limited to the absolute value |reqFx| of the target braking/driving force.

Figure 12:
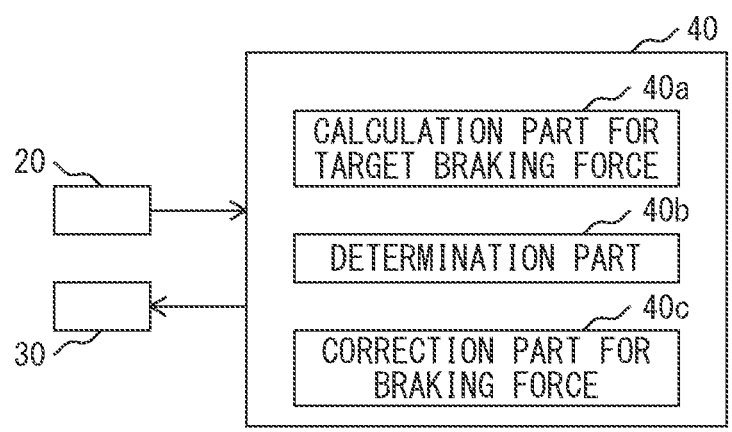
FIG. 12 is a functional block diagram of an embodiment according to the present disclosure.

Therefore, according to the embodiment according to the present disclosure, as shown in the functional block diagram of FIG. 12, a device 10 for controlling a vehicle 1 includes: a sensor 20 configured to detect a rudder angle; a calculation part 40a configured to calculate a target braking force for making a pitch angle equal to a target pitch angle, the target braking force increasing as the rudder angle increases; a determination part 40b configured to determine whether a steering action is in a steady state; a correction part 40c configured to correct the target braking force to be reduced by an offset amount when it is determined that the steering action is in a steady state; and an actuator 30 configured to apply the corrected target braking force to the vehicle.

This application claims the benefit of Japanese Patent Application No. 2020-144472, the entire disclosure of which is incorporated by reference herein.

REFERENCE SIGNS LIST

1 vehicle
10 device for controlling a vehicle
20 sensor
30 actuator
40 electronic control unit
40a calculation part
40b determination part
40c correction part

The invention claimed is:

1. A device for controlling a vehicle, comprising:
a sensor configured to detect a steering angle;
a processor configured to:
calculate a target braking force for applying a target change to an actual pitch angle to achieve a target pitch angle, the target braking force calculated to be proportional to the target change in pitch angle,
determine whether the steering angle is constant, and
calculate a corrected target braking force by reducing the target braking force by an offset amount based on the determination whether the steering angle is constant; and
an actuator configured to apply the corrected target braking force to the vehicle.

2. The device according to claim 1, wherein the processor is configured to increase the offset amount according to a rate of change when it is determined that the steering angle is constant.

3. The device according to claim 2, wherein the processor is configured to limit the rate of change of the offset amount to no greater than an allowable value determined according to a jerk of the steering angle.

4. The device according to claim 2, wherein the processor is configured to limit the offset amount to no greater than an absolute value of the target braking force.

5. The device according to claim 2, wherein the processor is configured to reduce the offset amount by a decrease amount of the target braking force when it is determined that the steering angle is constant.

6. The device according to claim 1, wherein the processor is configured to maintain the offset amount when it is determined that the steering angle is changing.

7. The device according to claim 1, wherein the processor is further configured to:
calculating the target pitch angle based on the steering angle, the target braking force thereby increasing as the steering angle increases, and
determine whether the steering angle is constant based on an absolute value of a time differential value of the target braking force.

8. A method of controlling a vehicle, comprising:
by a sensor, detecting a steering angle;
by a processor:
calculating a target braking force for applying a target change to an actual pitch angle to achieve a target pitch angle, the target braking force calculated to be proportional to the target change in pitch angle,
determining whether the steering angle is constant, and
calculating a corrected target braking force by reducing the target braking force by an offset amount based on the determination whether the steering angle is constant; and
by an actuator, applying the corrected target braking force to the vehicle.

* * * * *